(12) United States Patent
Victor

(10) Patent No.: US 9,323,761 B2
(45) Date of Patent: *Apr. 26, 2016

(54) OPTIMIZED QUERY ORDERING FOR FILE PATH INDEXING IN A CONTENT REPOSITORY

(71) Applicant: International Business Machines Corporation, Armonk, NY (US)

(72) Inventor: David B. Victor, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/708,684

(22) Filed: Dec. 7, 2012

(65) Prior Publication Data

US 2014/0164354 A1   Jun. 12, 2014

(51) Int. Cl.
*G06F 17/30* (2006.01)

(52) U.S. Cl.
CPC ................ *G06F 17/30091* (2013.01)

(58) Field of Classification Search
CPC .................................................. G06F 17/30156
USPC ......................................... 707/692, 673, 741
See application file for complete search history.

(56) References Cited

U.S. PATENT DOCUMENTS

| | | |
|---|---|---|
| 6,330,567 B1 | 12/2001 | Chao |
| 6,427,123 B1 | 7/2002 | Sedlar |
| 7,383,276 B2 | 6/2008 | Lomet |
| 7,584,460 B2 | 9/2009 | Broberg, III et al. |
| 7,660,808 B2 * | 2/2010 | Brechner et al. ........ 707/999.102 |
| 7,769,744 B2 | 8/2010 | Waas et al. |
| 7,831,591 B2 | 11/2010 | Masuda |
| 7,873,262 B2 | 1/2011 | Shibata et al. |
| 8,015,165 B2 | 9/2011 | Idicula et al. |
| 8,037,054 B2 | 10/2011 | Brawer et al. |
| 8,126,944 B2 | 2/2012 | McArdle |
| 8,401,522 B2 * | 3/2013 | Crawford et al. ............. 455/411 |

(Continued)

FOREIGN PATENT DOCUMENTS

| | | |
|---|---|---|
| EP | 1826692 A2 | 8/2007 |
| WO | 2008063275 A2 | 5/2008 |

OTHER PUBLICATIONS

Cabanac et al, "An Original Usage-based Metrics for Building a Unified View of Corporate Documents," DEXA'07: Proceedings of the 18th International Conference on Database and Expert Systems Applications, vol. 4653 of LNCS, pp. 202-212, 2007.

(Continued)

*Primary Examiner* — Baoquoc N To
(74) *Attorney, Agent, or Firm* — Shumaker & Sieffert, P.A.

(57) ABSTRACT

Techniques for indexing file paths of items in a repository may include, for each type associated with instances that are not associated with file path indexes, starting with folder types prior to item types in a round robin sequence, attempting to associate the instances of the type with file path indexes. The repository may be queried for instances of a current type that are not associated with file path indexes and that are filed in a folder that is associated with a file path index. Responsive to the querying returning one or more instances of the current type, the one or more instances of the current type may be associated with the file path indexes. Responsive to the querying returning one or more instances of the current type, attempting to associate the instances of the same current type with file path indexes may be repeated.

21 Claims, 12 Drawing Sheets

(56) References Cited

U.S. PATENT DOCUMENTS

| | | | |
|---|---|---|---|
| 8,495,619 B2* | 7/2013 | Tammana | 717/174 |
| 8,914,356 B2* | 12/2014 | Victor | 707/722 |
| 2004/0024778 A1 | 2/2004 | Cheo | |
| 2005/0022155 A1 | 1/2005 | Broberg, III et al. | |
| 2005/0050107 A1 | 3/2005 | Mane et al. | |
| 2005/0165760 A1 | 7/2005 | Seo | |
| 2005/0228791 A1 | 10/2005 | Thusoo et al. | |
| 2005/0246310 A1 | 11/2005 | Chang et al. | |
| 2006/0064412 A1 | 3/2006 | Cunningham et al. | |
| 2006/0161591 A1 | 7/2006 | Huang et al. | |
| 2006/0212457 A1 | 9/2006 | Pearce et al. | |
| 2007/0006217 A1* | 1/2007 | Tammana | 717/174 |
| 2007/0118561 A1 | 5/2007 | Idicula et al. | |
| 2007/0168327 A1 | 7/2007 | Lindblad et al. | |
| 2007/0168363 A1 | 7/2007 | Inaba et al. | |
| 2007/0203875 A1 | 8/2007 | Cave et al. | |
| 2007/0276807 A1 | 11/2007 | Chen et al. | |
| 2008/0046457 A1 | 2/2008 | Haub et al. | |
| 2008/0071805 A1 | 3/2008 | Mourra et al. | |
| 2008/0114803 A1 | 5/2008 | Chinchwadkar et al. | |
| 2008/0147614 A1 | 6/2008 | Tam et al. | |
| 2008/0177701 A1 | 7/2008 | Merritt et al. | |
| 2008/0195635 A1 | 8/2008 | Chand et al. | |
| 2008/0235252 A1 | 9/2008 | Sakai et al. | |
| 2008/0313155 A1 | 12/2008 | Atchison et al. | |
| 2008/0313260 A1* | 12/2008 | Sweet et al. | 709/201 |
| 2009/0112911 A1 | 4/2009 | Chu | |
| 2009/0187581 A1 | 7/2009 | Delisle et al. | |
| 2010/0010967 A1 | 1/2010 | Muller | |
| 2010/0100544 A1 | 4/2010 | Takeuchi et al. | |
| 2010/0257153 A1 | 10/2010 | Day et al. | |
| 2011/0078186 A1 | 3/2011 | Li et al. | |
| 2011/0145216 A1 | 6/2011 | Subramanya | |
| 2011/0161291 A1* | 6/2011 | Taleck et al. | 707/622 |
| 2011/0161723 A1* | 6/2011 | Taleck et al. | 714/4.11 |
| 2012/0016851 A1 | 1/2012 | Hrle et al. | |
| 2012/0096036 A1 | 4/2012 | Ebaugh et al. | |
| 2012/0173511 A1 | 7/2012 | Eto et al. | |
| 2012/0216260 A1* | 8/2012 | Crawford et al. | 726/5 |
| 2013/0066929 A1 | 3/2013 | Sedlar et al. | |
| 2013/0138629 A1 | 5/2013 | Rehmattullah | |
| 2013/0290301 A1* | 10/2013 | Victor | 707/722 |
| 2013/0302015 A1* | 11/2013 | Dini et al. | 386/248 |
| 2014/0109082 A1 | 4/2014 | Kimmet et al. | |
| 2014/0181116 A1 | 6/2014 | Wang | |

OTHER PUBLICATIONS

Paul Lensing et al., "hashFS: Applying Hashing to Optimize File Systems for Small File Reads," 2010 International Workshop on Storage Network Architecture and Parallel I/Os, IEEE, pp. 33-42 (May 3, 2010).

ip.com et al.; "System and Method for Just-In-Time (JIT) Indexing", IPCOM000214355D, Jan. 22, 2012 (4 pages).

U.S. Appl. No. 13/460,391, by David B. Victor, filed Apr. 30, 2012.

U.S. Appl. No. 13/666,798, by David B. Victor, filed Nov. 1, 2012.

* cited by examiner

OPTIMIZED QUERY ORDERING FOR FILE PATH INDEXING IN A CONTENT REPOSITORY

TECHNICAL FIELD

The invention relates to data storage, and more specifically relates to file paths of items in folder trees.

BACKGROUND

Documents and content stored as files in a content repository may be logically represented as a folder tree, where each file in the content repository may be associated with and accessed by a file path that specifies a unique location of the file in the content repository. In some examples, the content repository may maintain an index for the file paths of the files in the content repository (referred to as a "file path index"), so that the file path of a file in the content repository may be quickly determined instead of having to be determined on the fly when retrieving or otherwise accessing a file. As files are created, deleted, moved, and otherwise modified in the content repository, it may be necessary to update the file path index for the content repository.

SUMMARY

In one aspect, the disclosure is directed to a method for indexing file paths of items in a content repository. The method may include, for each of a plurality of types associated with one or more indexable instances that are not associated with file path indexes, in turn starting with folder types prior to item types in a round robin sequence, attempting, by at least one processor, to associate the one or more indexable instances of the type with file path indexes, including: querying, by the at least one processor, the content repository for instances of a current type out of the plurality of types that are not associated with one or more file path indexes and that are filed in a folder that is associated with a file path index, responsive to the querying returning, by the at least one processor, one or more instances of the current type, associating, by the at least one processor, the one or more instances of the current type with the one or more file path indexes, and responsive to the querying returning one or more instances of the current type, repeating, by the at least one processor, the attempting to associate the one or more indexable instances of the same current type with file path indexes.

In another aspect, the disclosure is directed to a computing system. The computing system may include one or more processors. The computing device may also include an indexer operable on the one or more processors and configured to: for each of a plurality of types associated with one or more indexable instances that are not associated with file path indexes, in turn starting with folder types prior to item types in a round robin sequence, attempt to associate the one or more indexable instances of the type with file path indexes, including: query the content repository for instances of a current type out of the plurality of types that are not associated with one or more file path indexes and that are filed in a folder that is associated with a file path index, responsive to the query returning one or more instances of the current type, associate the one or more instances of the current type with the one or more file path indexes, and responsive to the querying returning one or more instances of the current type, repeating the attempting to associate the one or more indexable instances of the same current type with file path indexes.

In another aspect, the disclosure is directed to a computer readable storage medium containing instructions. The instructions, when executed on at least one programmable processor, may cause the at least one programmable processor to perform operations. The operations may include for each of a plurality of types associated with one or more indexable instances that are not associated with file path indexes, in turn starting with folder types prior to item types in a round robin sequence, attempting to associate the one or more indexable instances of the type with file path indexes, including: querying the content repository for instances of a current type out of the plurality of types that are not associated with one or more file path indexes and that are filed in a folder that is associated with a file path index, responsive to the querying returning one or more instances of the current type, associating the one or more instances of the current type with the one or more file path indexes, and responsive to the querying returning one or more instances of the current type, repeating the attempting to associate the one or more indexable instances of the same current type with file path indexes.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
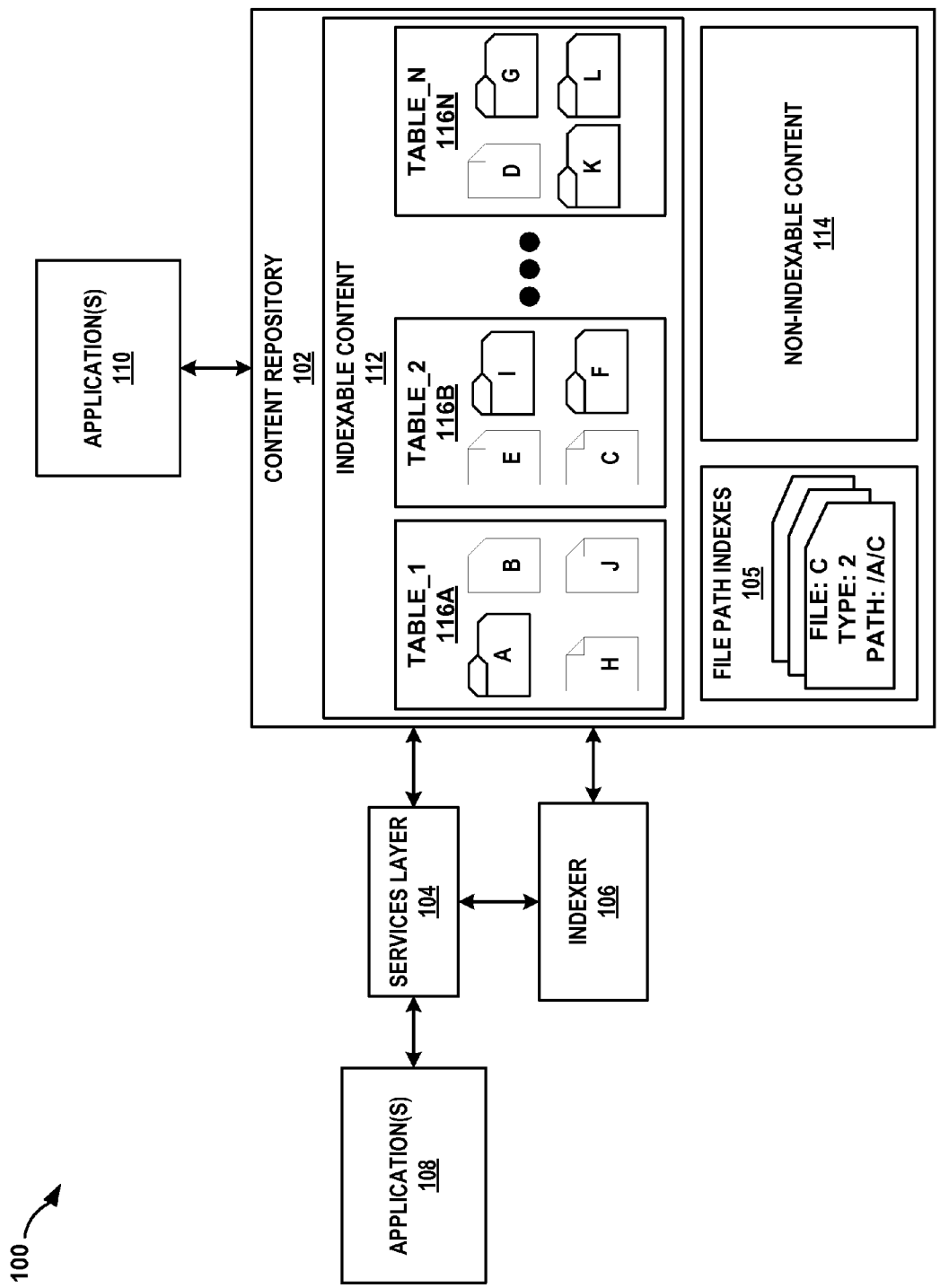
FIG. 1A is a block diagram illustrating a computing system including a content repository according to some aspects of the disclosure.

In general, techniques are described for creating and updating file path indexes for files that are represented as a folder tree in a content repository. Previous techniques such as crawling the folder tree to create and update file path indexes of files in the folder tree may be too resource intensive in an enterprise environment requiring high performance, high scaling, high stress, high load, and many users. One technique for ameliorating those deficiencies may include broadly querying across all types in a content repository to identify nodes that are missing file path indexes and to associate those nodes with file path indexes. However, querying broadly across all types in the content repository may sometimes be too resource intensive, slow, and complex to execute because such a broad query may necessitate evaluation of all possible folder and document types, including any combinations of folder and document types. In some examples, such queries may exceed the query language limits of the content repository, so that such queries are not able to be executed by the content repository.

Techniques for creating and updating file path indexes that is less resource intensive, less complex, and faster to execute compared to previous techniques may include splitting the queries into separate queries for each type in the content repository to identify nodes that are missing file path indexes and to associate those nodes with file path indexes. For example, each type in the content repository may, in turn, be queried for instances of the type that are not associated with one or more file path indexes and that are filed in a folder that is associated with a file path index. Because the content repository is queried for instances that are filed in a folder that is associated with a file path index, wasted queries that return no instances of a type can be minimized by maximizing the instances of folder types that are associated with file path indexes prior to querying for instances of other types. Thus, instances of folder types may be queried prior to instances other types. Furthermore, because it is unlikely that a single query for instances of a type that are missing file path indexes will return every instance of the type that are missing file path indexes, if a query for instance of a type that are missing file path indexes returns at least one instance of the type, the query for instances of that same type that are missing file path indexes may be re-performed prior to a query for instances of another type that are missing file path indexes, until the query returns zero instances of the type.

The techniques disclosed herein may take turns in querying each different type to visit select nodes of the folder tree of that type to update and maintain the file path indexes. For example, an optimized indexer is described that may, for example, visit only nodes within the folder tree that are of the specified type and that are missing indexes. This may significantly reduce or completely eliminate cost of visiting nodes that are already indexed or visiting nodes in the part of the content repository that should not be optimized for paths or indexed. Furthermore, by taking turns in querying for instances of a single type at a time, the queries may be less resource intensive compared with queries that query across a plurality of types. The queries may also be able to find instances without file path indexes at different levels of the folder tree, as opposed to some techniques that traverse the folder tree a level at a time. In addition, by querying for folder type prior to other types and by re-querying for instances of the same type if the query for instances of that type returned at least one instance of the type, the optimized indexer may reduce wasted queries that return zero instances of a type. In this way, the efficiency of identifying files without file path indexes and creating file path indexes for those files within the folder tree hierarchy may be improved.

In some examples, the content repository may be accessed via a services layer. The services layer may maintain the file path indexes for the files in the content repository so that a file path for a file in a folder tree may be quickly looked up. The services layer may create or update the file path indexes based on changes made to files in the content repository by applications accessing the content repository through the services layer. However, in some computing environments, certain applications may directly access the content repository without using the services layer to create, delete, move, or otherwise modify the files in the content repository, thereby causing the file path indexes maintained in the services layer to become out-of-date. As described, the techniques may be used, for example, to optimally update the file path indexes maintained by the services layer and to determine whether any files in the content repository do not have an associated file path index maintained by the services layer.

In accordance with the techniques described herein, an indexer may periodically determine whether instances of each type in the content repository qualify for an associated file path index but do not have an associated file path index by issuing queries for instances of a specified type, determining the file path for those instances, and may associate the file path indexes with those instances.

FIG. 1A is a block diagram illustrating a computing system including a content repository according to some aspects of the disclosure. In the example of FIG. 1A, computing system 100 includes content repository 102, services layer 104, indexer 106, one or more applications 108 that interact with content repository 102 via services layer 104, and one or more applications 110 that bypass services layer 104 and interact directly with content repository 102.

Computing system 100 may be made up of one or more computing devices that each includes one or more programmable processors. In some examples, computing system 100 is a part of an enterprise environment. Content repository 102, services layer 104, indexer 106, one or more applications 108, and one or more applications 110 may be operable on one or more computing devices. In some examples, a single computing device comprises content repository 102, services layer 104, indexer 106, one or more applications 108, and one or more applications 110. In some other examples, content repository 102, services layer 104, indexer 106, one or more applications 108, and one or more applications 110 are spread out over a plurality of computing devices.

Content repository 102 may be an enterprise repository that includes one or more data stores for storing documents or other digital content in computing system 100 as files on one or more computer readable storage media. In some examples, content repository 102 is organized into a hierarchy of folders and may natively support file paths or folder trees for accessing files stored within the folders. In some examples, items in content repository 102 may be associated with types, and the items in content repository 102 may be grouped or otherwise organized according to its associated type. For example, an item's associated type can denote information such as the department that the item belongs to in an organization, the database table the item resides in, and the like.

In some examples, content repository 102 is a relational database that receives queries and returns one or more files based on the queries. If content repository 102 is a relational database, then content repository 102 may include tables 116A-116N ("tables 116"), and each of the tables 116 may include one or more items. Items in content repository 102 may be associated with a plurality of different types. For example, items may be associated with a type based on which table (out of tables 116) in the relational database includes the item, so that items A, B, H, and J may be associated with type 1 because they are included in table_1 116A, items C, E, F, and I may be associated with type 2 because they are included in table_2 116B, and items D, G, K, and L may be associated with type N because they are included in table N.

In some environments, content repository 102 may include indexable content 112 and non-indexable content 114. Indexable content 112 may include items that may be represented hierarchically as part of one or more folder trees by services layer 104. Items in indexable content 112 may have an associated file path index in file path indexes 105 so that the items may be uniquely identified by a file path of the item in a folder tree. In some examples, file path indexes 105 is stored in content repository 102, and may be considered a part of non-indexable content 114. Conversely, non-indexable content 114 may include items that are not represented as folder trees by services layer 104. For example, non-indexable content 114 includes e-mail archives or e-mail inboxes that are not typically represented hierarchically as a folder tree.

Services layer 104 may be operably coupled to content repository 102 and may provide one or more software services and interfaces to software applications, such as one or more applications 108, for accessing items stored in content repository 102. In some examples, the services and interfaces provided by services layer 104 includes an application programming interface (API) that applications may use to access data stored in content repository 102. In some examples, services layer 104 provides web services that applications use to access data stored in content repository 102.

Services layer 104 may abstract the items in indexable content 112 of content repository 102 for one or more applications 108 so that they may appear as a part of one or more folder trees. For example, services layer 104 may maintain file path indexes 105 that includes a file path index indicating the file path for each item in a folder tree in indexable content 112. For example, as shown in FIG. 1A, file path indexes 105 may include a file path index for file "C" indicating a file path of "/A/C", thereby indicating that file C may be contained in folder A, which may be contained by the root folder of a folder tree. The file path index for file "C" may also indicate the type associated with type C. The services and interfaces provided by services layer 104, for example, enables one or more applications 108 to specify an item in indexable content 112 by a file path that uniquely identifies the item in the folder tree. As shown, items of one type can be contained in folders of another type. For example, while item C is associated with type 2, folders A may be associated with type 1.

One or more applications 110 may also directly access content repository 102 without use of services layer 104, and may directly create, delete, move, or otherwise modify files in content repository 102 without using or notifying services layer 104. Thus, file path indexes 105 maintained by services layer 104 can become out-of-date if one or more applications 110 add, delete, move, or otherwise modify items in indexable content 112. For example, one or more applications 110 may directly create a new file under a pre-existing folder in a folder tree, or may move a file from one folder to another folder in a folder tree.

Indexer 106 may be operably coupled to content repository 102 and services layer 104, and may index items in indexable content 112 in content repository 102. Indexer 106 may determine the types in content repository 102 that are subject to file path indexing and may calculate or otherwise estimate the maximum possible number of missing file path indexes for each type that is subject to file path indexing. For each type in content repository that has at least one missing file path index, indexer 106 may associate that type with the count of missing file path indexes and may store that association in a map (not shown). Indexer 106 may, for each of the types in turn starting with folder types prior to item types in a round robin sequence, determine instances of the type in indexable content 112 that do not have associated file path indexes 105 and are filed in a folder that is associated with a file path index, and may create file path indexes for those instances of the type. If content repository 102 is queryable, such as by being a relational database, indexer 106 may determine the instances of the type in indexable content 112 that do not have associated file path indexes 105 by sending queries to content repository 102. The number of instances of the type that were found during the query and associated with file path indexes may be subtracted from the count of missing file path indexes associated with the type in the map to keep track of the number of instances of the type that are still missing file path indexes.

For example, indexer 106 may identify two types that each has one or more missing file path indexes: a folder type and an item type. Indexer 106 may initially send a query to content repository 102 for one or more instances of the folder type that qualify for file path indexes, such as folder stored in indexable content 112, do not have file path indexes in file path indexes 105 and have a parent folder that has a file path index in file path indexes 105. Content repository 102 may receive the query from indexer 106, perform the query, and return a query result to indexer 106. The query result may indicate one or more resulting instances of the folder type that met all of the requirements of the query. In response, indexer 106 may create file path indexes for the resulting instances from the querying, may store each file path index in file path indexes 105, and may decrement the number of missing file path indexes associated with the folder type by the number of instances of the folder type returned in the query result and associated with file path indexes.

If the query result indicates at least one instance of the folder type that has met all of the requirements of the query, the query for one or more instances of the folder type may be repeated prior to a query is performed for any other type until no instances are returned as a result of the query.

After the query for one or more instances of the folder type returns no instances of the folder type, indexer 106 may subsequently send a query to content repository 102 for one or more instances of the item type out of the two types that qualify for file path indexes, such as items stored in indexable content 112, do not have file path indexes in file path indexes 105 and have a parent folder that has a file path index in file path indexes 105. Content repository 102 may receive the query from indexer 106, perform the query, and return a query result to indexer 106. The query result may indicate one or more resulting instances of the item type that met all of the requirements of the query. In response, indexer 106 may create file path indexes for the resulting instances from the querying, may store each file path index in file path indexes 105, and may decrement the number of missing file path indexes associated with the item type by the number of instances of the second item type returned in the query result and associated with file path indexes.

Similar to the folder type described above, if the query result indicates at least one instance of the item type that has met all of the requirements of the query, the query for one or more instances of the item type may be repeated prior to a query is performed for any other type until no instances of the item type are returned as a result of the query.

Because indexer 106 operates in a round robin schedule in querying for instances of each of the two types, after the query for one or more instances of the item type returns no instances of the item type, the process may repeat with the folder type and subsequently the item type until all of the indexable instances of the folder type and the item type that are missing file path indexes are now associated with file path indexes. In some examples, the count associated with each of the types will not reach zero because the count may include one or more instances in non-indexable content 114 that are missing file path indexes. Thus, instead of determining if the count associated with each of the types reaches zero, the process may end if all of the queries, consecutively one after another, all return zero items.

If the query for instances of a folder type or item type that qualify for file path indexes in file path indexes 105, do not have file path indexes in file path indexes 105, and have a parent folder that has a file path index in file path indexes 105 returns zero instances of the type, the zero instances may not necessarily indicate that every instance of the type that qualify for file path indexes is now associated with a file path index. Because the query includes the qualifier of having a parent folder that has a file path index, if the parent folder for an instance of that type is not yet associated with a file path index, then the instance of that type that is a child of the unindexed parent folder is also not returned by the query until its parent folder is associated with a file path index in file path indexes 105.

Indexer 106 may periodically issue queries to content repository 102 to keep file path indexes 105 up-to-date. In some examples, an enterprise administrator may manually cause indexer 106 to issue queries to content repository 102. In some examples, indexer 106 may automatically issue queries on a periodic basis.

Figure 1B:
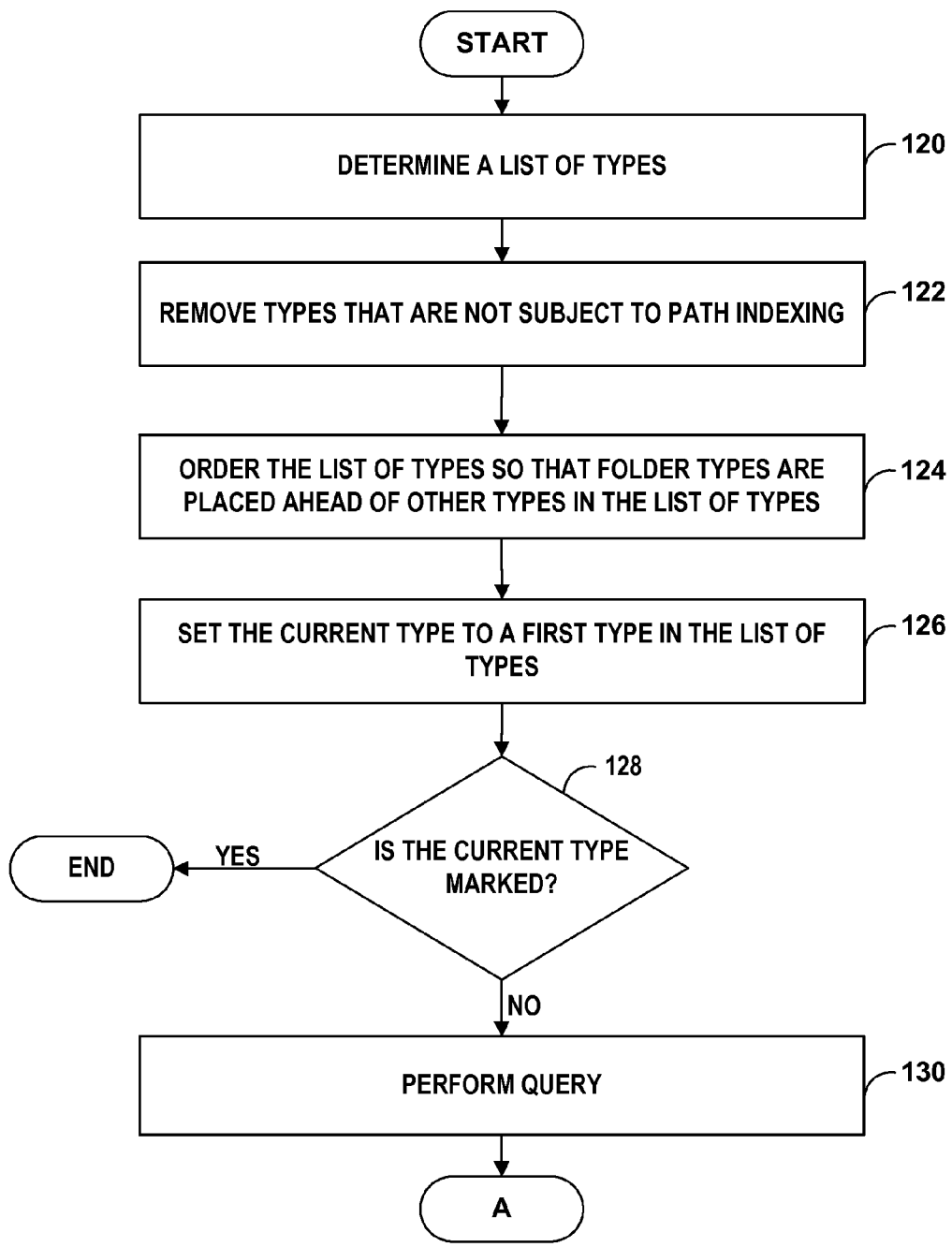
FIGS. 1B-1C is a flowchart illustrating an example method for querying and creating file path indexes according to some aspects of the disclosure.
Figure 1C:
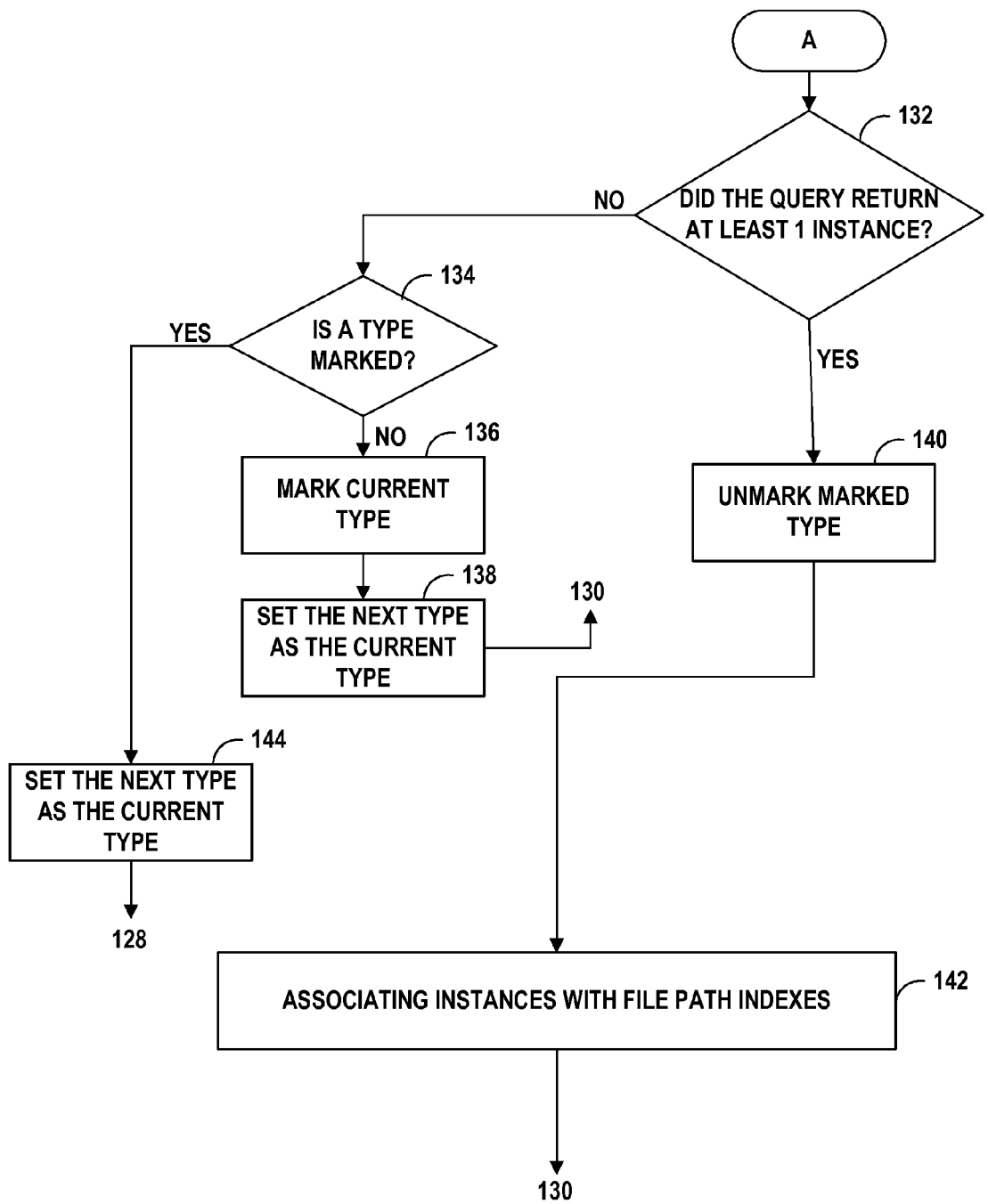

FIGS. 1B and 1C are a flowchart illustrating an example method for creating and maintaining file path indexes by querying for types according to some aspects of the disclosure. The method illustrated in FIGS. 1B and 1C may be useful if one or more instances of an item type or a folder type is stored in non-indexable content 114. For example, if not every item type or folder type will eventually reach a zero count, then an item type or folder type that will never reach a zero count may prevent the termination of querying for instances that are missing file path indexes if termination of the query in is triggered upon the count reaching zero for each type. Instead indexer 106 may determine that there are no instances in indexable content 112 that are missing file path indexes if each query for instances of types returns no instances in sequence, and the querying may terminate responsive to that determination.

To determine if each query for instances of types returns no instances, a type may be marked if the query for instances of the type returns no instances and if the immediately preceding query for instances of the type immediately preceding the type returned at least one instance. As long as subsequent queries for instances of subsequent types return no instances, the marked type may remain marked. However, if a subsequent query for instances of a subsequent type returns at least one instance, the marked type may be unmarked. If the queries loop back to the marked type and the marked type remains marked, then it may be determined that there are no instances in indexable content 112 that are missing file path indexes, and the querying may terminate. Some examples of marking a specified type may include associating the specified type with a marker or any other indication that the specified type is marked, setting a marked type variable to the specified type, or any other techniques of marking the specified type.

As shown in FIG. 1B, indexer 106 may determine a list of types (e.g., item types or folder types) (120) and may remove the types from the list of types that are not subject to file path indexing (122). Because folder types are to be queried prior to other types, indexer 106 may order the list of types so that folder types are placed ahead of other types in the list of types (124). Subsequently, indexer 106 may set the current type to the first type in the list of types (126). Indexer 106 may determine if the current type is marked (128). Determining if the current type is marked may, in some examples, include determining if the type is associated with a mark or an indication that the type is marked, or may also include determining if a marked type variable is set to the type. If the type is marked, then the process may end. If the type is not marked, indexer 106 may perform a query for instances of the current type that are not associated with file path indexes and that are stored in a folder that is associated with a file path index (130).

As shown in FIG. 1C, indexer 106 may determine if the query returned at least 1 instance (132). If the query returned at least 1 instance of the current type, indexer 106 may unmark any currently marked types (140), associate the instance with file path indexes (142), and re-perform the query 130 for the current type. If the query did not return at least 1 instance of the type, indexer 106 may determine if a type in the list of types is currently marked (134). If no types in the list of types are currently marked, indexer 106 may mark the current type (136), set the next type in the list of types as the current type (138), and perform the query for the current type (130). If a type is currently marked, indexer may set the next type as the current type (144) and may check whether the current type is already marked (128).

Figure 1D:
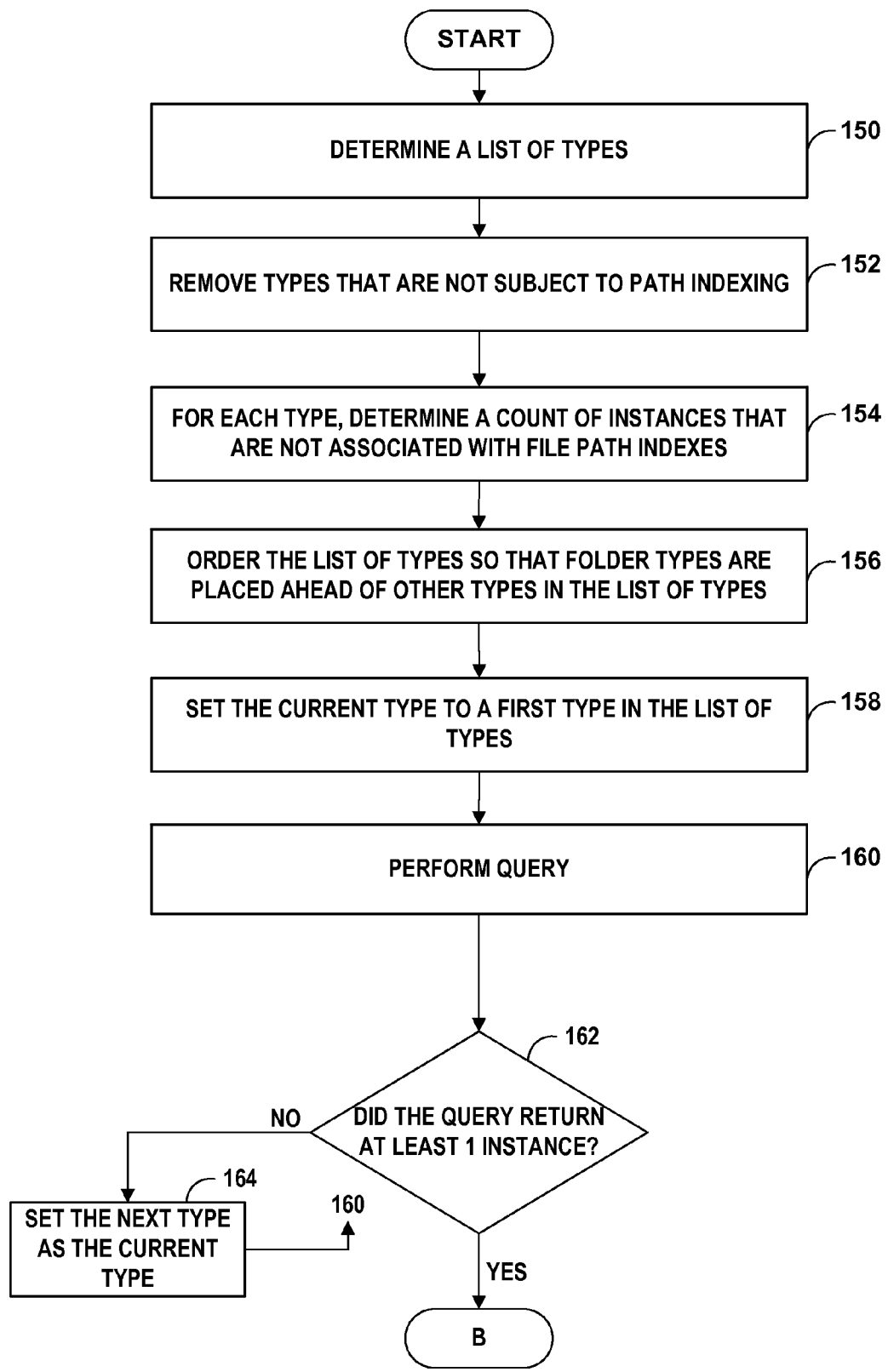
FIGS. 1D-1E is a flowchart illustrating an example method for querying and creating file path indexes according to some aspects of the disclosure.
Figure 1E:
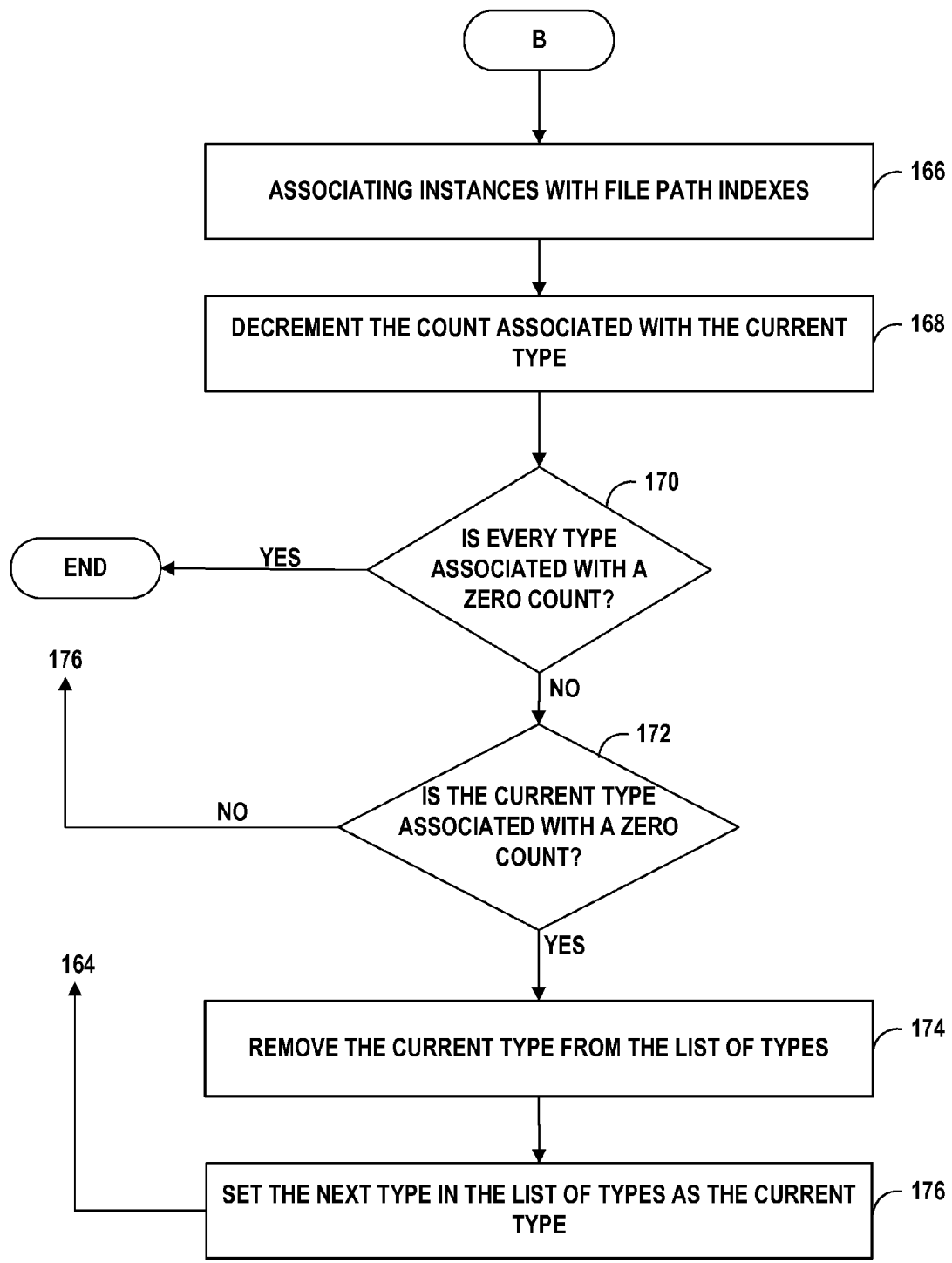

FIGS. 1D and 1E are a flowchart illustrating an example method for creating and maintaining file path indexes by querying for types according to some aspects of the disclosure. As shown in FIG. 1D, indexer 106 may determine a list of types in content repository 102 (150). Indexer 106 may remove from the list any types that are not subject to file path indexing (152). For example, types that are only associated with instances in non-indexable content 114 and are not associated with any instances in indexable content 112 may be removed from the list. For each type in the list, indexer 106 may determine a count of instances that qualify for file path indexes but are not associated with file path indexes (154). For example, indexer 106 may perform a query for instances of each type that qualify for path indexes but are not associated with file path indexes. Alternatively, indexer 106 may estimate the count of instances of each type that qualify for file path indexes but are not associated with file path indexes. Indexer 106 may associate each type having one or more instances that qualify for path indexes, are not associated with file path indexes, and that are filed in one or more folders in content repository 102 with a count of the one or more instances, and may store such an association in a map. Indexer 106 may, for each type associated with the count of the one or more instances in turn in a round robin sequence until the count of the one or more instances reaches zero for each type, process the types to associate instances of the item types with file path indexes. Because folder types are to be queried prior to other types, indexer 106 may order the list of types so that folder types are placed ahead of other types in the list of types (156). Indexer 106 may set the current type to the first type in the list of types (158). Indexer 106 may perform a query for instances of the current type that are not associated with file path indexes and that are stored in a folder that is associated with a file path index (160). Indexer 106 may determine if the query returned at least one instance of the current item type (162). If the query did not return at least one instance of the current item type, indexer 106 may set the next type in the list of types as the current type (164) and may repeat the query 162.

As shown in FIG. 1E, if the query returned one or more instances of the current item type, indexer 106 may associated the one or more instances returned as a result of the query with file path indexes (166), and may decrement the count associated with the current type by the count of instances of the current type that was returned and associated with file path indexes (168). Indexer 106 may determine if every type in the map is associated with a zero count (170). If so, then the process may end. However, if not every item type in the map is associated with a zero count, then indexer 106 may determine if the current type is associated with a zero count (172). If the current type is associated with a zero count, indexer 106 may remove the current type from the list of types (174), may set the next type in the list of types as the current type (176), and may repeat the process with that type (164). As discussed above, because indexer 106 processes the item types in a round-robin fashion, if the current item type is the last item type in the map, the indexer 106 may circle back to the first item type in the map as the next item type. If the current type is not associated with a zero count, indexer 106 may set the next type in the list of types as the current type (176) and may repeat the process with that type (164).

Figure 2A:
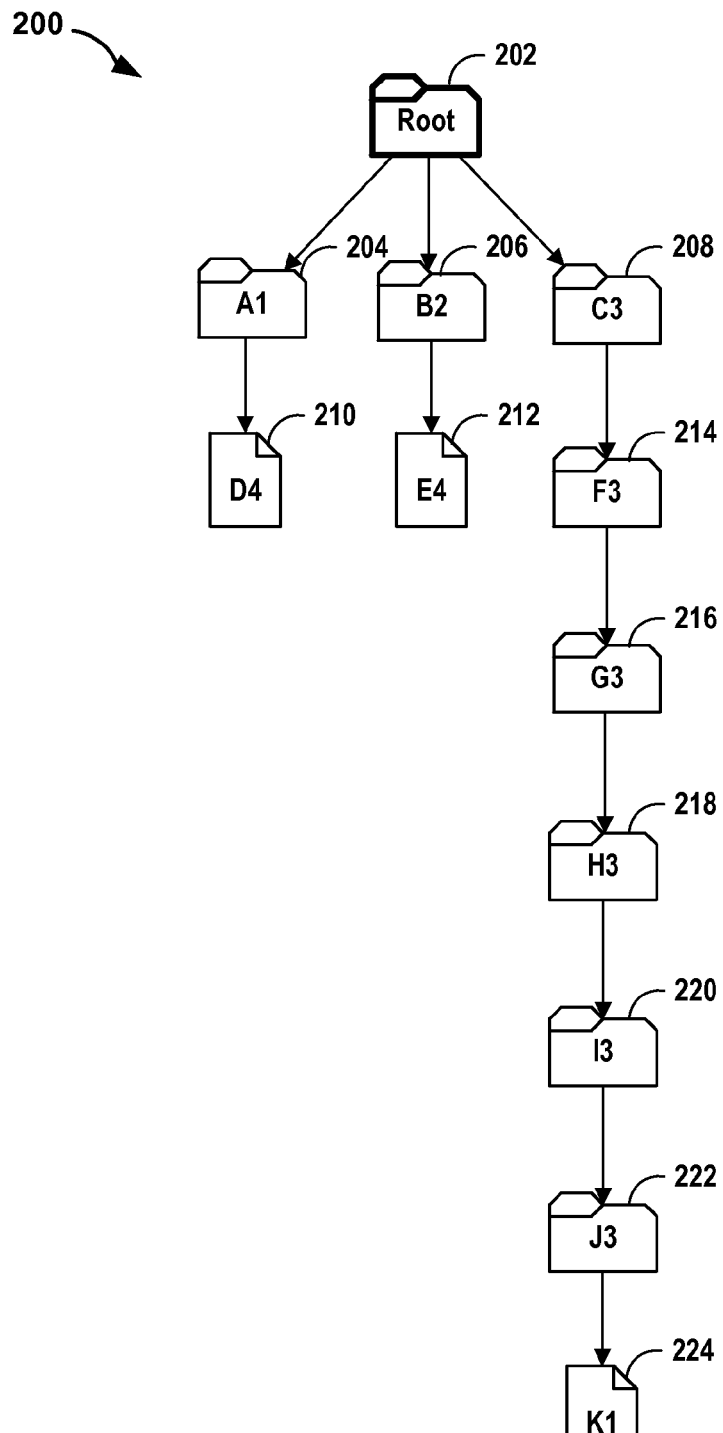
FIGS. 2A-2F are conceptual diagrams illustrating an example technique for indexing files in a folder tree according to some aspects of the disclosure.
Figure 2A:

FIGS. 2A-2F are conceptual diagrams illustrating an example technique for indexing files in a folder tree by an example indexer, such as indexer 106 shown in FIG. 1A, according to aspects of the disclosure. As shown in FIG. 2A, folder tree 200 includes files and directories arranged hierarchically, so that a folder may contain files and directories, and those directories may contain files and directories, and so on.

Folder tree 200 may include root folder 202 that is at the topmost level of folder tree 200. Because root folder 202 is considered to be indexed, the representation of root folder 202 may be outlined by a thick black border, as shown in FIG. 2A. Children of root folder 202 may include folder A1 204, folder B2 206, folder C3 208, file D4 210, file E4 212, folder F3 214, folder G3 216, folder H3 218, folder I3 220, folder J3 222, and file K1 224. Items that are associated with file path indexes may be represented with a thick border, while items that are not associated with file path indexes may be represented with a thin border. Because none of the children of root folder 202 are indexed, the representations of the children of root folder 202 are outlined by a thin border. As also shown in FIG. 2A, items that are identified with a character together with a number may be associated with a type identified by the number so that, for example, folder A1 204 may be associated with type 1, folder B2 206 may be associated with type 2, folder C3 208 may be associated with type 3, item D4 210 may be associated with type 4, and so on.

For each type in content repository 102 having one or more indexable instances that are not associated with file path indexes, indexer 106 may, type-by-type, attempt to associate one or more instances of each type with file path indexes. Because items in content repository 102 are likely to be contained in a folder, indexer 106 may attempt to associate instances of folder types with file path indexes prior to attempting to associate instances of other types in content repository 102, and may process the types in a round robin schedule so that if indexer 106 may continuously loop through all of the types until all indexable instances are associated with file path indexes. Furthermore, because a single query for instances of a type may be unlikely to return every single instance of the type that are missing file path indexes, if the query for instances of a type that are missing file path indexes results in one or more instances of the type, then the next query performed by indexer 106 may be a query for instances of the same type that are missing file path indexes.

For each type having one or more indexable instances in content repository, indexer 106 may attempt to associate one or more instances of a type with file path indexes by querying content repository 102 for instances of the type that (1) qualify for file path indexes, (2) do not have file path indexes, and (3) have a parent folder that is associated with a file path index, and associating the instances, if any, returned by the query with file path indexes. The round robin schedule denotes that indexer 106 may repeatedly cycle through the types in order in a circular fashion until indexable instances that are missing file path indexes are associated with file path indexes.

In the example shown in FIG. 2A, because types 1, 2, and 3 are folder types and because type 4 is not a folder type, indexer 106 may first attempt to associate instances of folder types 1, 2, and 3 with file path indexes prior to attempting to associate instances of type 4 with file path indexes. Furthermore, as discussed above, if indexer 106 is able to successfully associate one or more instances of a type with a file path index, indexer 106 may, in the next query, immediately re-attempt to associate instances of the same type with file path indexes. Thus, indexer 106 may first attempt to associate instances of type 1 with file path indexes by querying for instances of type 1 that (1) qualify for file path indexes, (2) do not have file path indexes, and (3) have a parent folder that is associated with a file path index, and may associate the instances returned by the query, if any, with file path indexes. In the example shown in FIG. 2A, the query may return folder A1 204, and indexer 106 may associate folder A1 204 with a file path index. Because the query for instances of type 1 resulted in an instance of type 1 (i.e., folder A1 204), indexer 106 may immediately re-query for instances of type 1. However, because there are no other instances of type 1 in folder tree 200 that are missing file path indexes, the query will not return any instances of type 1.

Figure 2B:
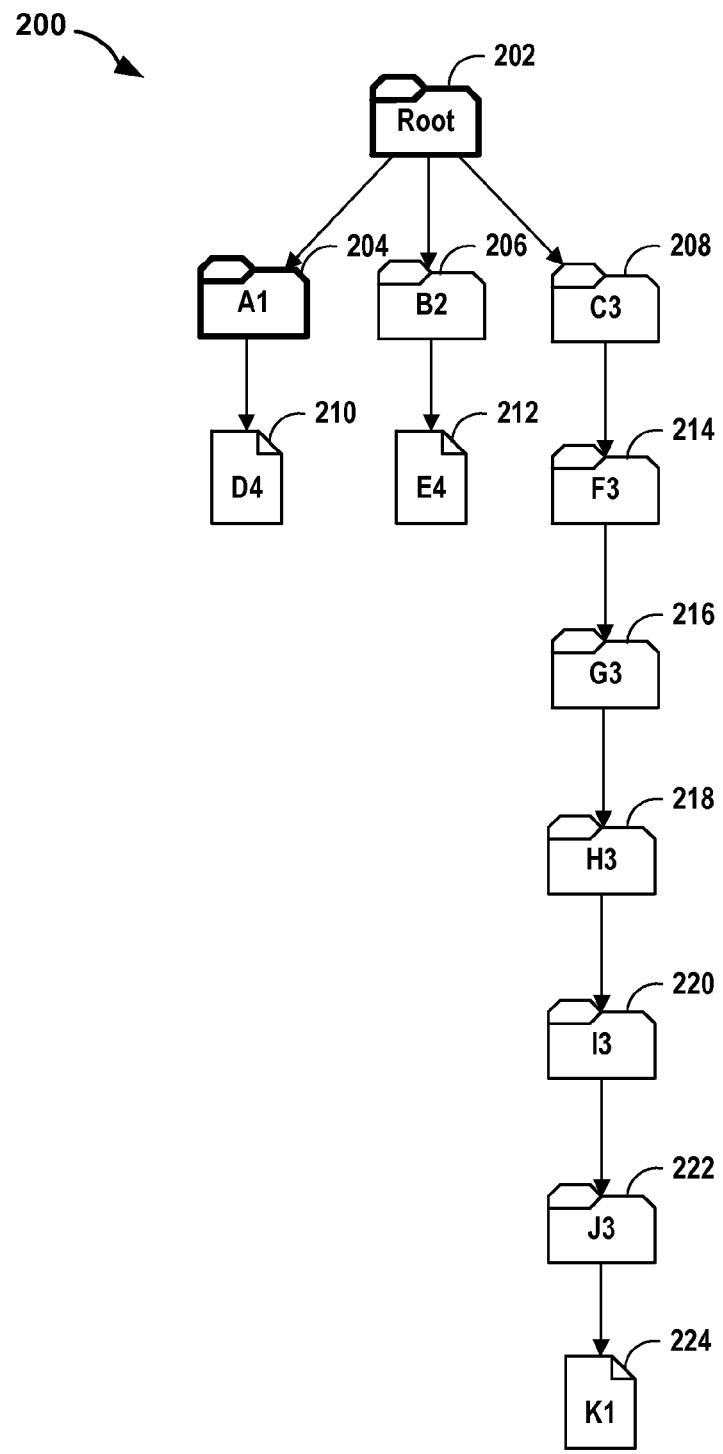
Figure 2B:

As shown in FIG. 2B, after indexer 106 has attempted to associate indexable instances of type 1 with file path indexes, folder A1 204 is now associated with a file path index, as denoted by the thick border around the representation of folder A1 204 in FIG. 2B. After the query for instances of type 1 that are missing file path indexes returned zero instances of type 1, indexer may move on and attempt to associate instances of type 2 with file path indexes by querying for instances of type 2 that (1) qualify for file path indexes, (2) do not have file path indexes, and (3) have a parent folder that is associated with a file path index, and may associate the instances returned by the query, if any, with file path indexes. The query may return folder B2 206, and indexer 106 may associate folder B2 206 with a file path index. Because the query for instances of type 2 resulted in an instance of type 2 (i.e., folder B2 206), indexer 106 may immediately re-query for instances of type 2. However, because there are no other instances of type 2 in folder tree 200, the query will return zero instances of type 2.

Figure 2C:
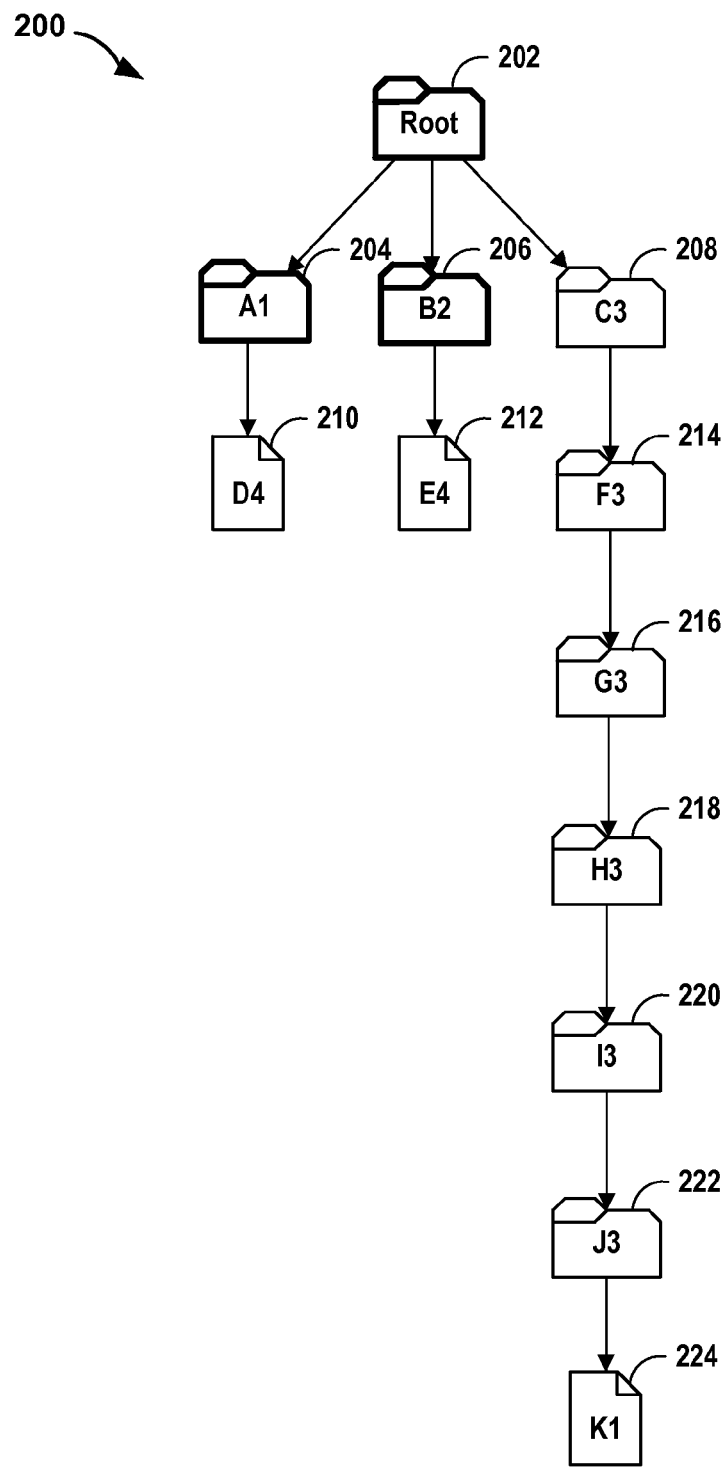
Figure 2C:

As shown in FIG. 2C, after indexer 106 has attempted to associate indexable instances of type 1 and type 2 with file path indexes, folder A1 204 and folder B2 206 are now associated with file path indexes. After the query for instances of type 2 returned zero instances of type 2, indexer may move on and attempt to associate instances of type 3 with file path indexes by querying for instances of type 3 that (1) qualify for file path indexes, (2) do not have file path indexes, and (3) have a parent folder that is associated with a file path index, and may associate the instances returned by the query, if any, with file path indexes. The query may return folder C3 208, and indexer 106 may associate folder C3 208 with a file path index. Because the query for instances of type 3 resulted in an instance of type 3 (i.e., folder C3 208), indexer 106 may immediately re-query for instances of type 3. The query may return folder F3 214, and indexer 106 may associate F3 214 with a file path index. Because the query for instances of type 3 once again resulted in an instance of type 3 (i.e., folder F3 214), indexer 106 may immediately re-query for instances of type 3. The query may return folder G3 216, and indexer 106 may associate G3 216 with a file path index. Because the query for instances of type 3 once again resulted in an instance of type 3 (i.e., folder G3 216), indexer 106 may immediately re-query for instances of type 3. The query may return folder H3 218, and indexer 106 may associate H3 218 with a file path index. Because the query for instances of type 3 once again resulted in an instance of type 3 (i.e., folder H3 218), indexer 106 may immediately re-query for instances of type 3. The query may return folder I3 220, and indexer 106 may associate I3 220 with a file path index. Because the query for instances of type 3 once again resulted in an instance of type 3 (i.e., folder I3 220), indexer 106 may immediately re-query for instances of type 3. The query may return folder J3 222, and indexer 106 may associate J3 222 with a file path index. Finally, the query for instances of type 3 resulted in an instance of type 3 (i.e., folder J3 222), indexer 106 may immediately re-query for instances of type 3. However, because there are no other indexable instances of type 3 that are missing file path indexes in folder tree 200, the query does not result in any instances of type 3.

Figure 2D:
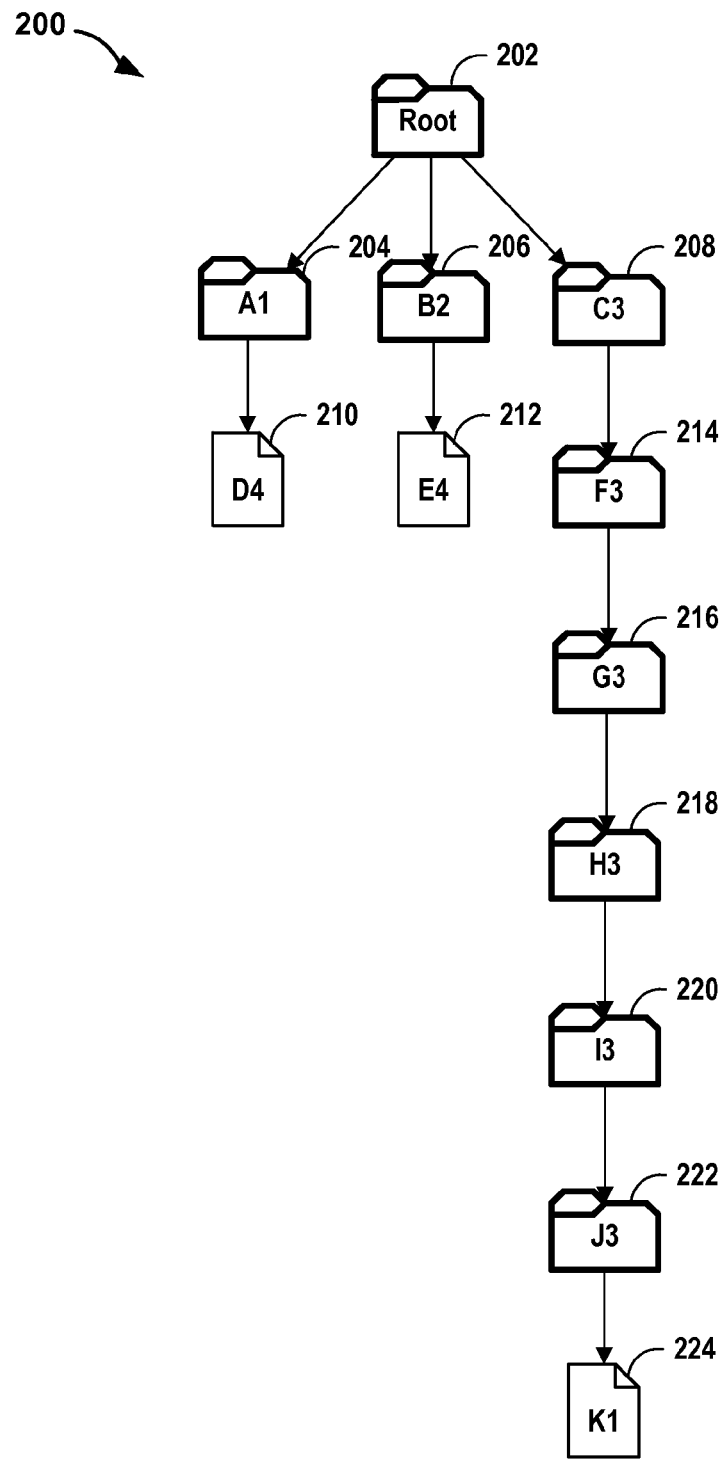
Figure 2D:

As shown in FIG. 2D, after indexer 106 has attempted to associate indexable instances of types 1, 2, and 3 with file path indexes, all indexable instances of types 1, 2, and 3 in folder tree 200 except for file K1 224 are now associated with file path indexes. After the query for instances of type 3 returned zero instances of type 3, indexer may move on and attempt to associate instances of type 4 with file path indexes by querying for instances of type 4 that (1) qualify for file path indexes, (2) do not have file path indexes, and (3) have a parent folder that is associated with a file path index, and may associate the instances returned by the query, if any, with file path indexes. The query may return file D4 210 and file E4 212, and indexer 106 may associate each of the files D4 210 and E4 212 with a file path index. Because the query for instances of type 4 resulted in one or more instances of type 4, indexer 106 may immediately re-query for instances of type 4. However, because there are no other instances of type 4 in folder tree 200 that are not associated with file path indexes, the query does not result in any instances of type 4.

Figure 2E:
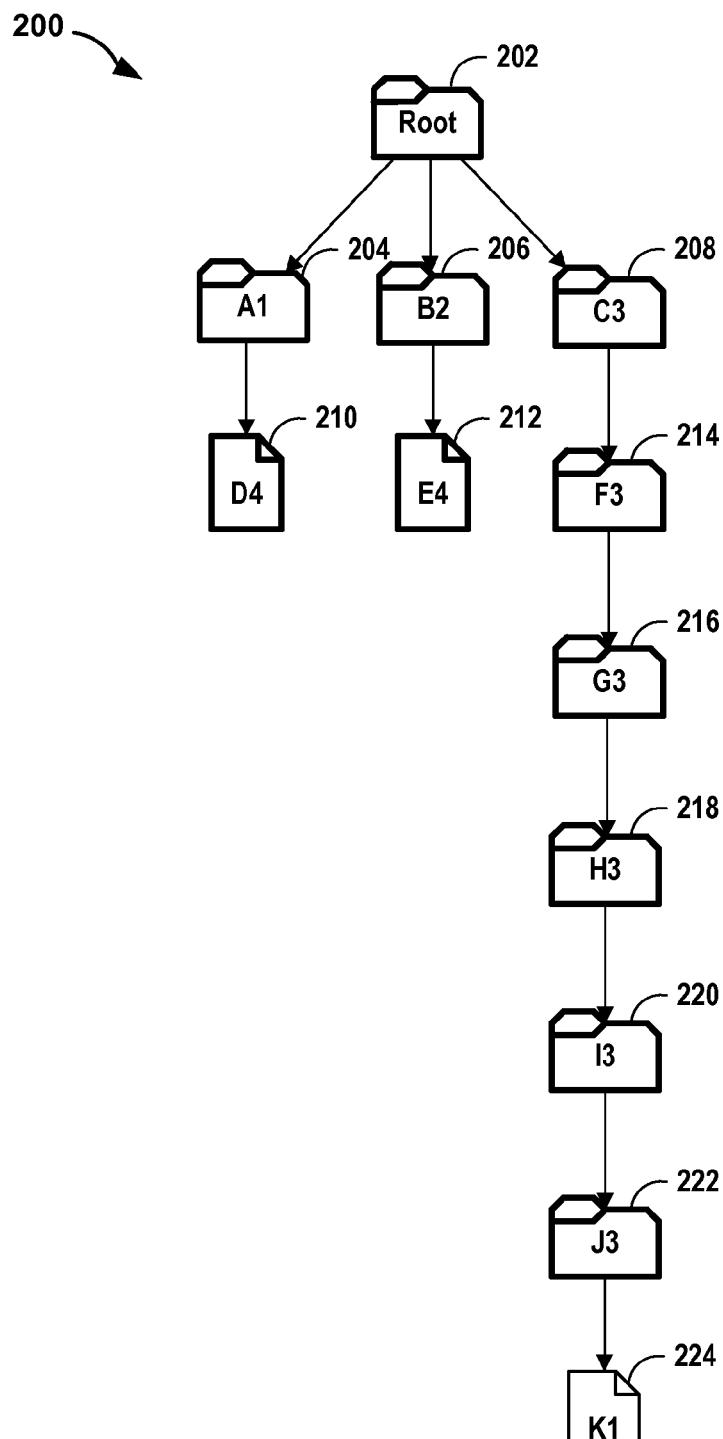

As shown in FIG. 2E, after indexer 106 has attempted to associate indexable instances of types 1, 2, 3, and 4 with file path indexes, all indexable instances of types 1, 2, 3, and 4 in folder tree 200 except for file K1 224 are now associated with file path indexes. Because type 4 is the last type out of types 1, 2, 3, and 4 to be queried by indexer 106, indexer 106 may, after attempting to associate indexable instances of type 3 with file path indexes, loop back to type 1 and attempt to associate indexable instances of type 1 with file path indexes by querying for instances of type 1 that (1) qualify for file path indexes, (2) do not have file path indexes, and (3) have a parent folder that is associated with a file path index, and may associate the instances returned by the query, if any, with file path indexes. The query may return file K1 224, and indexer 106 may associate file K1 224 with a file path index. Because the query for instances of type 1 resulted in one or more instances of type 1, indexer 106 may immediately re-query for instances of type 1. However, because there are no other instances of type 1 in folder tree 200 that are not associated with a file path index, this query does not result in any instances of type 1.

Figure 2F:
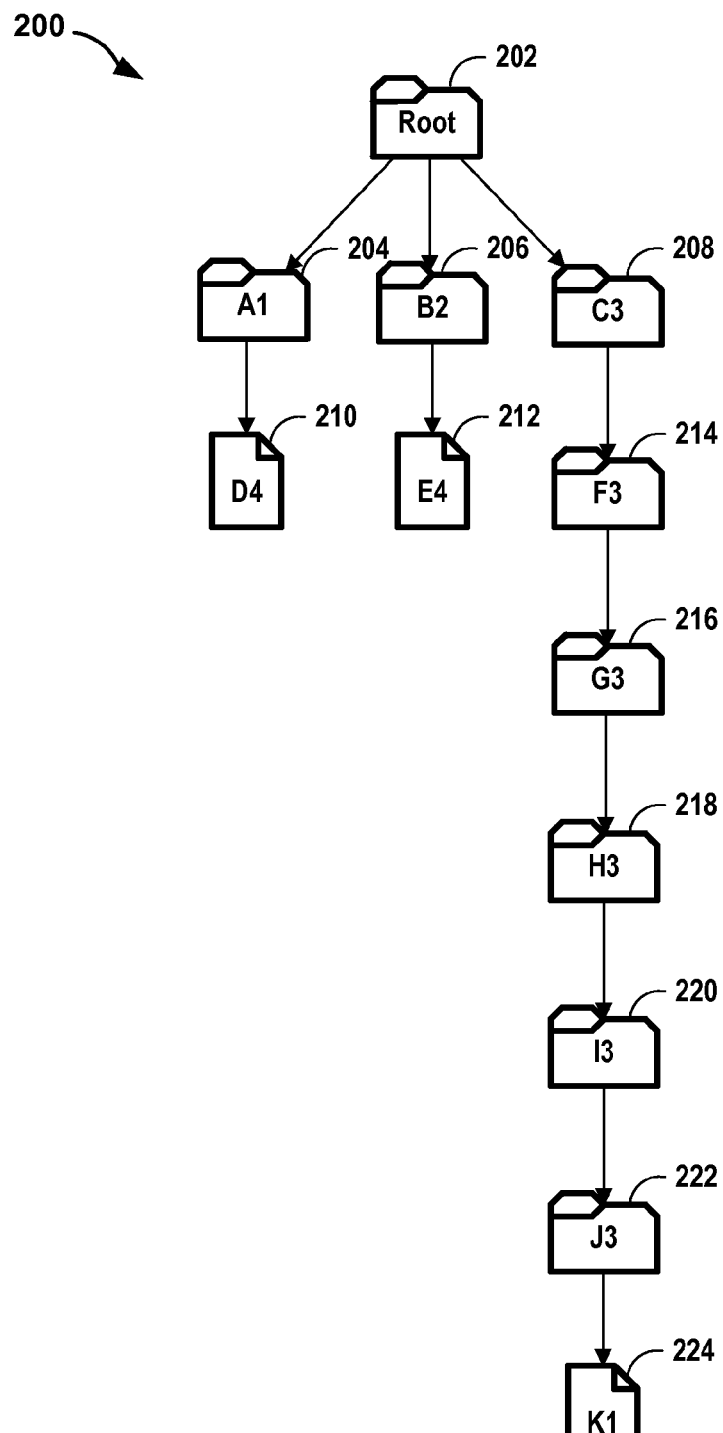

As shown in FIG. 2F, every file or folder in folder tree 200 is now associated with a file path index, and thus indexer 106 may terminate querying for indexable instances of the types represented in folder tree 200 that are not associated with file path indexes. Indexer 106 may determine whether to terminate the querying using a variety of techniques. In one example technique, as illustrated above with respect to FIGS. 1B-1C, if a query by indexer 106 for instances of a type resulted in zero instances of the type that are missing file path indexes, and if there are no types that are currently marked, then the queried type may be marked. If a subsequent query by indexer 106 returns one or more instances, then indexer 106 may unmark the previously marked type. However, if indexer 106 loops through the types during the querying and associating, and reaches the already-marked type, then indexer 106 may determine that all of the instances in indexable content 112 of content repository 102 that are missing file path indexes are now associated with file path indexes and may terminate the process.

In another example technique, as illustrated above with respect to FIGS. 1D-1E, prior to the round-robin querying of the types, indexer 106 may, for each type, determine a count of indexable instances of the type that are missing file path indexes. In some examples, indexer 106 may estimate the count of indexable instances of each type that are missing file path indexes. Indexer 106 may associate the count of indexable instances with the respective type in a map, and may remove from the map any types that are associated with a zero count of instances. As instances of a type are associated with file path indexes, the count of instances for that type may be decremented accordingly. If the count of instances for a type reaches zero, indexer 106 may skip querying for instances of that type and may remove the type from the map. If the count of indexable instances that are missing file path indexes for each type reaches zero, indexer 106 may determine that there are no indexable instances that are missing file path indexes and may terminate the querying.

Figure 3:
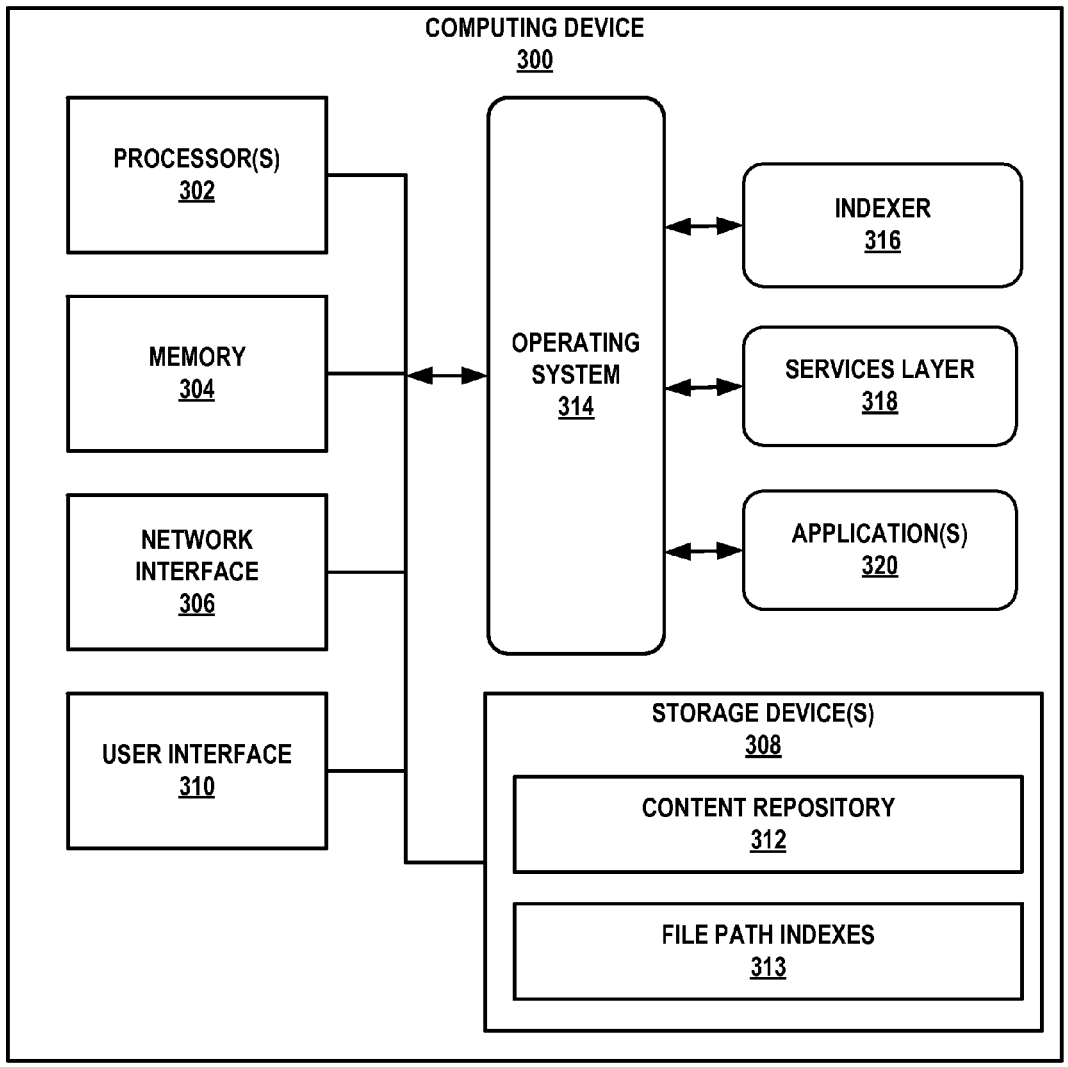
FIG. 3 is a block diagram illustrating an example computing device according to some aspects of the disclosure.

FIG. 3 is a block diagram illustrating an example computing device according to some aspects of the disclosure. As shown in FIG. 3, computing device 300 may be one of one or more computing devices that make up a computing system, such as computing system 100 shown in FIG. 1A. Computing device 300 may include one or more processors 302, memory 304, a network interface 306, one or more storage devices 308, and user interface 310. Computing device 300 may also include an operating system 314, which may include modules and/or applications that are executable by processors 302 and computing device 300. Computing device 300, in one example, may also include indexer 316, services layer 318, and one or more applications 320, which all may be executable by one or more processors 302 of computing device 300. Each of components 302, 304, 306, 308, 310, 314, 316, 318, and 320 may be interconnected (physically, communicatively, and/or operatively) for inter-component communications.

Processors 302, in one example, may be configured to implement functionality and/or process instructions for execution within computing device 300. For example, processors 302 may be capable of processing instructions stored in memory 304, or instructions stored on storage devices 308. These instructions may define or otherwise control the operation of operating system 314, indexer 316, services layer 318, and one or more applications 320.

Memory 304 may, in one example, be configured to store information within computing device 300 during operation. Memory 304, in some examples, may be described as a computer readable storage medium. In some examples, memory 304 may be a temporary memory, meaning that a primary purpose of memory 304 is not long-term storage. Memory 304 may, in some examples, be described as a volatile memory, meaning that memory 304 does not maintain stored contents when computing device 300 is turned off. Examples of volatile memories may include random access memories (RAM), dynamic random access memories (DRAM), static random access memories (SRAM), and other forms of volatile memories known in the art. In some examples, memory 304 may be used to store program instructions for execution by processors 302. Memory 304 may, in one example, be used by software or applications running on computing device 300 (e.g., indexer 316) to temporarily store information during program execution.

Computing device 300 may, in some examples, also include network interface 306. Computing device 300 may, in one example, use network interface 306 to communicate with external devices via one or more networks. Network interface 306 may be a network interface card, such as an Ethernet card, an optical transceiver, a radio frequency transceiver, or any other type of device that can send and receive information.

Other examples of such network interfaces may include Bluetooth, 3G and Wi-Fi radios in mobile computing devices as well as USB. In some examples, computing device 300 may use network interface 306 to wirelessly communicate with an external device such as a server, mobile phone, or other networked computing device.

Storage devices 308 may, in some examples, also include one or more computer readable storage media. Storage devices 308 may be configured to store larger amounts of information than memory 304. Storage devices 308 may further be configured for long-term storage of information. In some examples, storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In some examples, storage devices 308 may include content repository 312, such as content repository 102 shown in FIG. 1A, and file path indexes 313, such as file path indexes 105 shown in FIG. 1A. Content repository 312 may include one or more data stores for storing digital content. In some examples, content repository 312 may not natively support file paths or folder trees. For example, content repository 312 may be a queryable repository, such as a relational database. In some examples, content repository 312 may be an enterprise repository. Content repository 312, in some examples, may include indexable content and non-indexable content. Indexable content may include data that may be represented as folder trees by services layer 318. Non-indexable content may include data that are not represented as folder trees by services layer 318. In some examples, file path indexes 313 may include a file path index indicating the file path for each file in a folder tree in indexable content of content repository 312, so that services layer 318 may, for example, enable one or more applications 320 to specify an item in content repository 102 by a file path that uniquely identifies the item in a folder tree. In some examples, file path indexes may be stored in content repository 312 and may be considered non-indexable content.

Computing device 300 may, in some examples, also include one or more user interfaces 310. User interface 310 may be configured to receive input from a user (e.g., tactile, audio, or video feedback). User interface 310 may include a touch-sensitive and/or a presence-sensitive screen, mouse, a keyboard, a voice responsive system, or any other type of device for detecting a command from a user. In some examples, user interface 310 may include a touch-sensitive screen, mouse, keyboard, microphone, or camera.

User interface 310 may also include, combined or separate from input devices, output devices. In this manner, user interface 310 may be configured to provide output to a user using tactile, audio, or video stimuli. In one example, user interface 310 may include a touch-sensitive screen, sound card, a video graphics adapter card, or any other type of device for converting a signal into an appropriate form understandable to humans or machines. In addition, user interface 310 may include a speaker, a cathode ray tube (CRT) monitor, a liquid crystal display (LCD), or any other type of device that can generate intelligible output to a user.

Computing device 300 may, in some examples, also include operating system 314. Operating system 314 may, in some examples, control the operation of components of computing device 300. For example, operating system 314 may, in one example, facilitate the interaction of indexer 316 with services layer 318, applications 320, processors 302, memory 304, network interface 306, storage device 308, and user interface 310.

Computing device 300 may, in some examples, further include indexer 316, which may be similar to indexer 106 shown in FIG. 1A. Indexer 316 may be an executable software application running on one or more processors 302 and stored in memory 304 or one or more storage devices 308. In some examples, indexer 316 may be configured to determine items in a content repository, such as content repository 102, that are not associated with file path indexes, and to associate those items with file path indexes.

Indexer 306 may be configured to, for each of a plurality of types associated with one or more indexable instances that are not associated with file path indexes, in turn starting with folder types prior to other types in a round robin sequence, attempt to associate the one or more indexable instances of the type with file path indexes. Indexer 306 may query content repository 102 for instances of a current type out of the plurality of types that are not associated with one or more file path indexes and that are filed in a folder that is associated with a file path index, responsive to the query return one or more instances of the type, and associate the one or more instances of the type with the one or more file path indexes. Indexer 306 may also repeat the query for instances of a type if a query for instances of that type that are missing file path indexes returned one or more instances of the type that are missing file path indexes.

Computing device 300 may, in some examples, further include services layer 318, which may be similar to services layer 104 shown in FIG. 1A. Services layer 318 may be an executable software application running on one or more processors 302 and stored in memory 304 or one or more storage devices 308. In some examples, services layer 318 may be configured to provide services and interfaces to applications, such as one or more applications 320, for accessing data stored in content repository 312. In some examples, the services and interfaces provided by services layer 318 may include an application programming interface (API) that applications may use to access data stored in content repository 312. In some other examples, services layer 318 may provide web services that applications may use to access data stored in content repository 312 over the web.

In some examples, services layer 318 may also be configured to abstract items in content repository 312 so that they may appear as one or more folder trees to one or more applications. For example, services layer 318 may be configured to maintain file path indexes 313 that includes a file path index indicating the file path for files in a folder tree in content repository 312. The services and interfaces provided by services layer 318 may, for example, enable one or more applications to specify an item in content repository 312 by a file path that uniquely identifies the item in a folder tree.

Computing device 300 may, in some examples, further include one or more applications 320, such as one or more applications 108 and one or more applications 110 shown in FIG. 1A. One or more applications 320 may be an executable software application running on one or more processors 302 and stored in memory 304 or one or more storage devices 308. In some examples, one or more applications 320 may be configured to access items in content repository 312 via services layer 318. In some examples, one or more applications 320 may be configured to directly access items in content repository 312 without using services layer 318.

Any applications (e.g., indexer 316) implemented within or executed by computing device 300 may be implemented or contained within, operable by, executed by, and/or be operatively/communicatively coupled to components of computing device 300 (e.g., processors 302, memory 304, network interface 306, storage devices 308, and user interface 310).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various embodiments of the invention have been described. These and other embodiments are within the scope of the following claims.

The invention claimed is:

1. A method for associating file path indexes with items and folders in a content repository, wherein the items and the folders are each associated with one of a plurality of types, the method comprising:

for each of a plurality of types associated with one or more indexable instances that are not associated with file path indexes, in turn starting with folder types prior to item types in a round robin sequence, attempting, by at least one processor, to associate the one or more indexable instances of the type with file path indexes, including:

querying, by the at least one processor, the content repository for instances of a current type out of the plurality of types that are not associated with one or more file path indexes and that are filed in a folder that is associated with a file path index, responsive to the querying returning, by the at least one processor, one or more instances of the current type, associating the one or more instances of the current type with the one or more file path indexes, and in response to the querying returning, by the at least one processor, one or more instances of the current type, repeating the attempting to associate the one or more indexable instances of the same current type with file path indexes, marking, by the at least one processor, the current type if the querying returns zero instances of the current type and if no other type is marked.

2. The method of claim 1, further comprising: ceasing, by the at least one processor, the attempting to associate if the current type is already marked.

3. The method of claim 1, further comprising: unmarking, by the at least one processor, a marked type if subsequently querying another type returns one or more instances of the another type.

4. The method of claim 1, further comprising: storing, by the at least one processor in a map, associations between each type having one or more instances that are not associated with file path indexes and that are filed in one or more folders and a count of the one or more instances.

5. The method of claim 4, wherein the attempting to associate further comprises: adjusting, by the at least one processor, the count of the one or more instances associated with the current type based on the associating the one or more instances of the current type with the one or more file path indexes.

6. The method of claim 5, wherein the adjusting further comprises: removing, by the at least one processor, an association of the current type with the count of the one or more instances from the map if the count of the one or more instances of the current type reaches zero.

7. The method of claim 1, further comprising: removing, by the at least one processor, one or more types that are not subject to file path indexing from the plurality of types.

8. A computing system comprising:
one or more processors; and
an indexer operable on the one or more processors and configured to: for each of a plurality of types associated with one or more indexable instances that are not associated with file path indexes,
in turn starting with folder types prior to item types in a round robin sequence, attempt to associate the one or more indexable instances of the type with file path indexes, including:
query the content repository for instances of a current type out of the plurality of types that are not associated with one or more file path indexes and that are filed in a folder that is associated with a file path index,
responsive to the query returning one or more instances of the current type, associate the one or more instances of the current type with the one or more file path indexes, and
in response to the query returning one or more instances of the current type, repeat the attempting to associate the one or more indexable instances of the same current type with file path indexes, wherein query the content repository further comprises: mark the current type if the querying returns zero instances of the current type and if no other type is marked.

9. The computing system of claim 8, wherein the indexer is further configured to: cease to attempt to associate if the current type is already marked.

10. The computing of claim 8, wherein the indexer is further configured to: unmark a marked type if a subsequent query of another type returns one or more instances of the another type.

11. The computing system of claim 8, wherein the indexer is further configured to: store, in a map, associations between each type having one or more instances that are not associated with file path indexes and that are filed in one or more folders and a count of the one or more instances.

12. The computing system of claim 11, wherein the indexer is further configured to: adjust the count of the one or more instances associated with the current type based on the one or more instances of the current type associated with the one or more file path indexes.

13. The computing system of claim 12, wherein adjust the count of the one or more instances associated with the current type further comprises: remove an association of the current type with the count of the one or more instances from the map if the count of the one or more instances reaches zero.

14. The computing system of claim 8, wherein the indexer is further configured to: remove one or more types that are not subject to file path indexing from the plurality of types.

15. A computer readable storage medium containing instructions that, when executed on at least one programmable processor, cause the at least one programmable processor to perform operations comprising:
for each of a plurality of types associated with one or more indexable instances that are not associated with file path indexes, in turn starting with folder types prior to item types in a round robin sequence, attempting to associate the one or more indexable instances of the type with file path indexes, including:
querying the content repository for instances of a current type out of the plurality of types that are not associated with one or more file path indexes and that are filed in a folder that is associated with a file path index,
responsive to the querying returning one or more instances of the current type, associating the one or more instances of the current type with the one or more file path indexes, and
in response to the querying returning one or more instances of the current type, repeating the attempting to associate the one or more indexable instances of the same current type with file path indexes,
wherein the querying further comprises: marking the current type if the querying returns zero instances of the current type and if no other type is marked.

16. The non-transitory computer readable storage medium of claim 15, wherein the operations further comprises: ceasing the attempting to associate if the current type is already marked.

17. The non-transitory computer readable storage medium of claim 15, wherein the operations further comprises: unmarking a marked type if subsequently querying another type returns one or more instances of the another type.

18. The non-transitory computer readable storage medium of claim 15, wherein the operations further comprise: storing, in a map, associations between each type having one or more instances that are not associated with file path indexes and that are filed in one or more folders and a count of the one or more instances.

19. The non-transitory computer readable storage medium of claim 18, wherein the attempting to associate further comprises: adjusting the count of the one or more instances associated with the current type based on the associating the one or more instances of the current type with the one or more file path indexes.

20. The non-transitory computer readable storage medium of claim 19, wherein the adjusting further comprises: removing an association of the current type with the count of the one or more instances from the map if the count of the one or more instances of the current type reaches zero.

21. The non-transitory computer readable storage medium of claim 15, wherein the operations further comprise: removing one or more types that are not subject to file path indexing from the plurality of types.

* * * * *